United States Patent
Brown, Jr. et al.

[19]

[11] Patent Number: 6,053,190
[45] Date of Patent: Apr. 25, 2000

[54] TWO-PERSON TREE STAND SYSTEM FOR DEER HUNTING

[76] Inventors: Lem J. Brown, Jr., 2490 Heard Bridge Rd., Wauchula, Fla. 33873; Wayne Pippin, 3505 Southcrest Blvd., Lakeland, Fla. 33813

[21] Appl. No.: 09/102,107

[22] Filed: Jun. 22, 1998

[51] Int. Cl.[7] .................................. A01M 31/00
[52] U.S. Cl. ....................... 135/90; 135/901; 52/79.1; 52/79.9
[58] Field of Search ................. 135/90, 901; 43/1; 52/79.1, 79.9

[56] References Cited

U.S. PATENT DOCUMENTS

| | | | |
|---|---|---|---|
| 2,854,705 | 10/1958 | McClaran | 135/901 |
| 3,220,766 | 11/1965 | Kates | 135/901 |
| 4,412,398 | 11/1983 | Harmon | 43/1 |
| 4,606,142 | 8/1986 | Reneau | 52/280 |
| 5,327,993 | 7/1994 | Stark | 135/901 |
| 5,341,588 | 8/1994 | Lizotte | 43/1 |
| 5,528,849 | 6/1996 | Plinta | 43/1 |
| 5,669,403 | 9/1997 | Belcher | 135/90 |
| 5,803,694 | 9/1998 | Steele | 135/901 |
| 5,862,827 | 1/1999 | Howze | 135/901 |

*Primary Examiner*—Beth Aubrey

[57] ABSTRACT

A two-person tree stand system for deer hunting comprising a housing frame having a horizontal floor formed of peripheral rods in a rectangular configuration with cross support rods forming a rectangular access space. The housing also has a roof formed of peripheral rods in a generally rectangular configuration. A central rod with diagonal support rods forms an A-frame. The housing also has sides formed of vertical rods coupling the floor and roof with diagonal support rods. A wooden floor is positioned on the floor of the frame with an opening over the access space. The wooden floor further has a cross-strengthening brace with protruding ends receivable within recesses in the frame. A fabric roof is positionable over the roof of the frame. Four side walls are positionable over the sides of the frame.

3 Claims, 4 Drawing Sheets

TWO-PERSON TREE STAND SYSTEM FOR DEER HUNTING

BACKGROUND OF THE INVENTION

1. Field of the Invention

The present invention relates to a new and improved two-person tree stand system for deer hunting and, more particularly, pertains to providing an elevated house for deer hunters.

2. Description of the Prior Art

The use of tree stands of known designs and configurations is known in the prior art. More specifically, tree stands of known designs and configurations heretofore devised and utilized for the purpose of assisting hunters through known methods and apparatuses are known to consist basically of familiar, expected, and obvious structural configurations, notwithstanding the myriad of designs encompassed by the crowded prior art which has been developed for the fulfillment of countless objectives and requirements.

The prior art discloses a large number of devices for providing an elevated house for deer hunters. By way of example, U.S. Pat. No. 2,854,705 to McClaran issued Oct. 7, 1958; U.S. Pat. No. 3,220,766 to Kates issued Nov. 30, 1965; U.S. Pat. No. 4,412,398 to Harmon issued Nov. 1, 1983; U.S. Pat. No. 4,606,142 to Reneau issued Aug. 19, 1986; and U.S. Pat. No. 5,327,993 to Stark, Sr. issued Jul. 12, 1994. Two foreign patents are noted: WO 91/02870 to Norman, issue/priority date Mar. 7, 1991 and WO 97/05351 to Coory et al., issue/priority date Feb. 13, 1997.

In this respect, the two-person tree stand system for deer hunting according to the present invention substantially departs from the conventional concepts and designs of the prior art, and in doing so provides an apparatus primarily developed for the purpose of providing an elevated house for deer hunters.

Therefore, it can be appreciated that there exists a continuing need for a new and improved two-person tree stand system for deer hunting which can be used for providing an elevated house for deer hunters. In this regard, the present invention substantially fulfills this need.

SUMMARY OF THE INVENTION

In view of the foregoing disadvantages inherent in the known types of tree stands of known designs and configurations now present in the prior art, the present invention provides an improved two-person tree stand system for deer hunting. As such, the general purpose of the present invention, which will be described subsequently in greater detail, is to provide a new and improved two-person tree stand system for deer hunting and methods which have all the advantages of the prior art and none of the disadvantages.

To attain this, the present invention essentially comprises a housing frame having a horizontal floor formed of peripheral rods in a rectangular configuration with cross support rods forming a rectangular access space, the housing also having a roof formed of peripheral rods in a generally rectangular configuration and a central rod with diagonal support rods forming an A-frame, the housing also having sides formed of vertical rods coupling the floor and roof with diagonal support rods, the rods being formed of welded-together steel. Included is a wooden floor positioned on the floor of the frame with an opening over the access space. The wooden floor has a cross-strengthening brace with protruding ends receivable within recesses in the frame. A fabric roof positionable over the roof of the frame. Four side walls positionable over the sides of the frame. Eyelets formed in the frame at an upper extent of one side wall with a chain positionable around a supporting tree with turn buckles coupling the eyelets and chain to retain the housing at an elevated location. Lastly, upstanding hooks at each upper corner of the frame with an associated lifting device formed of a plate and chain surrounding the tree and a supporting structure and pulley having a movable rope for lifting the frame to an elevated location for then being supported by the eyelets, chain and turn buckles.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved two-person tree stand system for deer hunting which has all the advantages of the prior art tree stands of known designs and configurations and none of the disadvantages.

It is another object of the present invention to provide a new and improved two-person tree stand system for deer hunting which may be easily and efficiently manufactured and marketed.

It is a further object of the present invention to provide a new and improved two-person tree stand system for deer hunting which is of a durable and reliable construction.

An even further object of the present invention is to provide a new and improved two-person tree stand system for deer hunting which is susceptible of a low cost of manufacture with regard to both materials and labor, and which accordingly is then susceptible of low prices of sale to the consuming public, thereby making such tree stands of known designs and configurations economically available to the buying public.

Still yet another object of the present invention is to provide a new and improved two-person tree stand system for deer hunting which provides in the apparatuses and methods of the prior art some of the advantages thereof, while simultaneously overcoming some of the disadvantages normally associated therewith.

Even still another object of the present invention is to provide an elevated house for deer hunters.

Lastly, it is an object of the present invention to provide a two-person tree stand system for deer hunting comprising a housing frame having a horizontal floor formed of peripheral rods in a rectangular configuration with cross support rods forming a rectangular access space. The housing also has a roof formed of peripheral rods in a generally rectangular configuration. A central rod with diagonal support rods forms an A-frame. The housing also has sides formed of vertical rods coupling the floor and roof with diagonal support rods. A wooden floor is positioned on the floor of the frame with an opening over the access space. The wooden floor further has a cross-strengthening brace with protruding ends receivable within recesses in the frame. A fabric roof is positionable over the roof of the frame. Four side walls are positionable over the sides of the frame.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
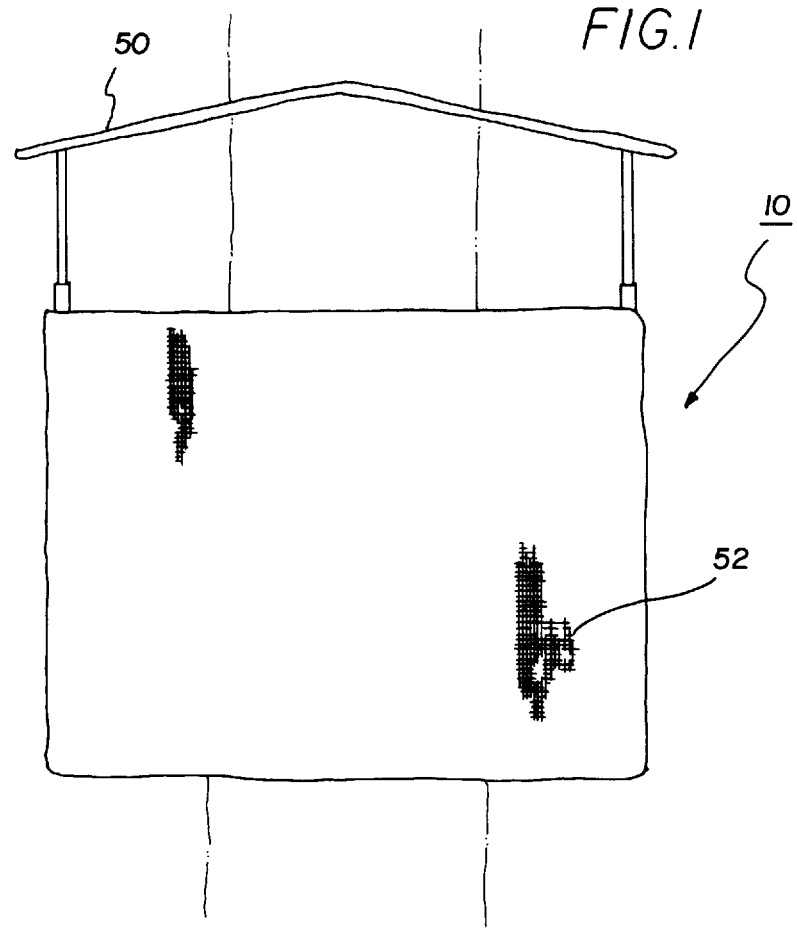
FIG. 1 is a front elevational view of the two-person tree stand system for deer hunting constructed in accordance with the principles of the present invention.
Figure 2:
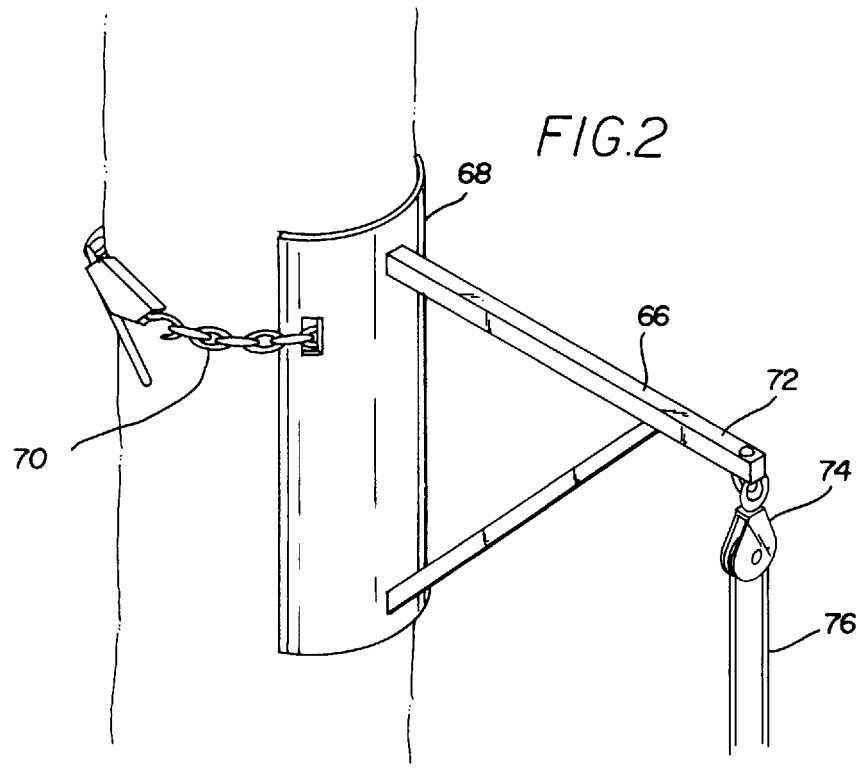
FIG. 2 is a perspective view of a lifting device for positioning the tree stand to its intended elevational orientation.
Figure 3:
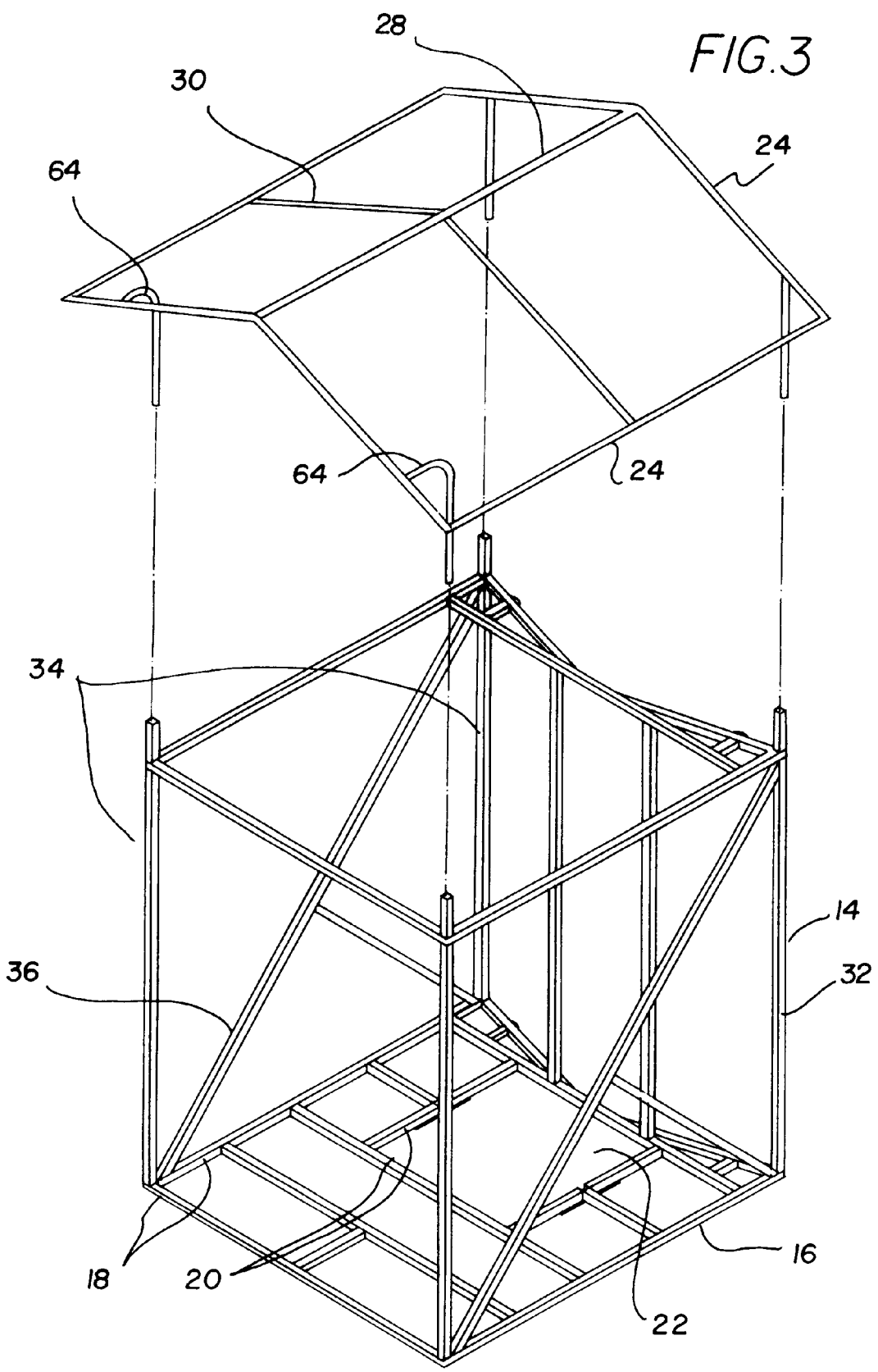
FIG. 3 is an exploded perspective view of the frame of the tree stand shown in FIG. 1.
Figure 4:
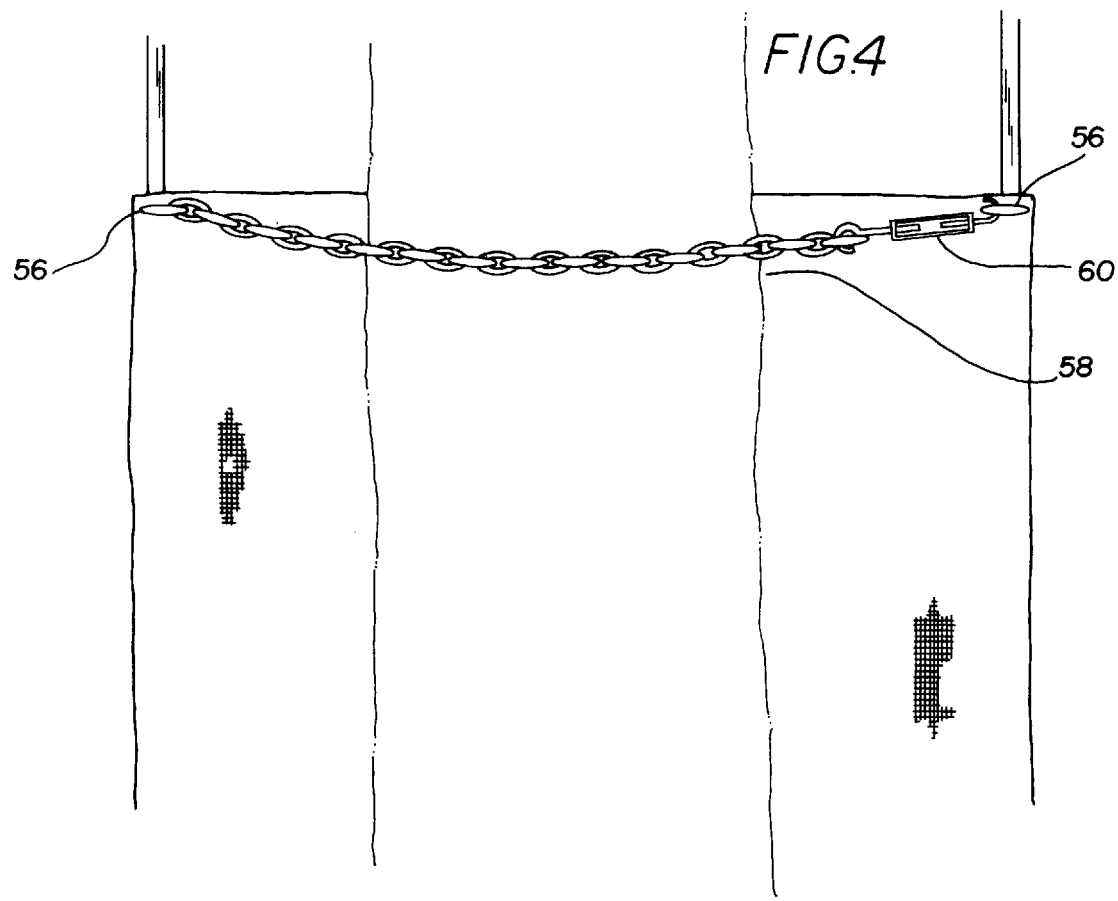
FIG. 4 is a rear elevational view of a portion of the tree stand showing its coupling to a tree.
Figure 5:
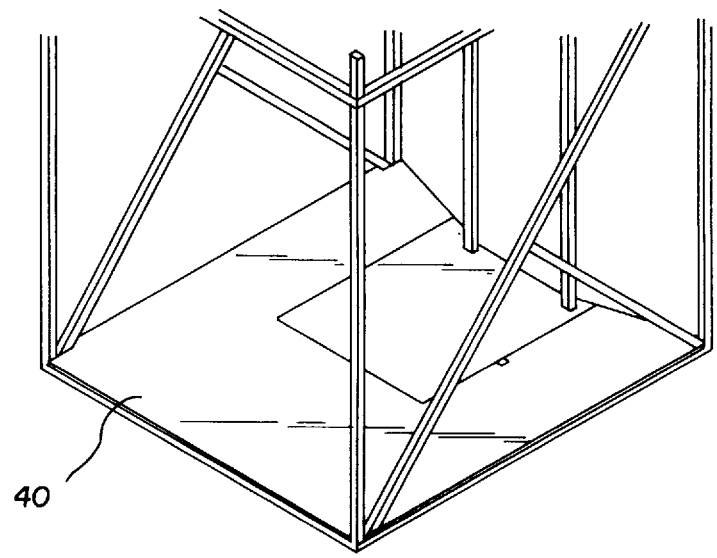
FIG. 5 is a partial perspective view similar to FIG. 3 illustrating the wooden floor in place with an associated trap door.
Figure 6:
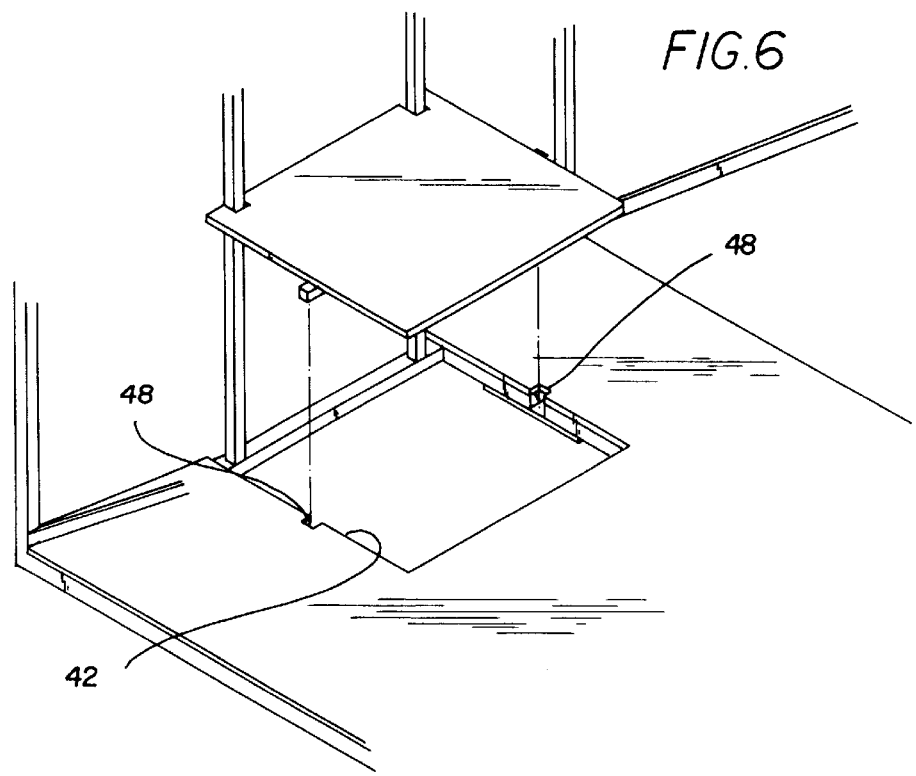
FIG. 6 is an exploded perspective view of the apparatus shown in FIG. 5.
Figure 7:
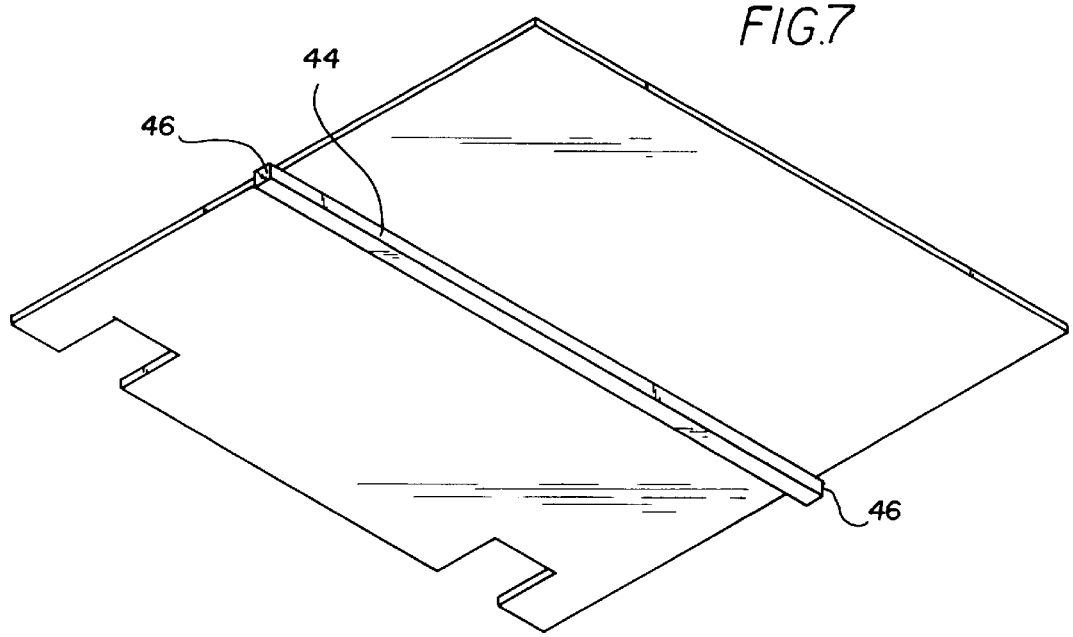
FIG. 7 is a bottom perspective view of the trap door shown in FIGS. 5 and 6.

With reference now to the drawings, and in particular to FIG. 1 thereof, the preferred embodiment of the new and improved two-person tree stand system for deer hunting embodying the principles and concepts of the present invention and generally designated by the reference numeral 10 will be described.

The present invention, the new and improved two-person tree stand system for deer hunting is a system 10 comprised of a plurality of components. In their broadest context, the components include a housing frame, a floor, a roof, side walls, eyelets and hooks. Each of the individual components is specifically configured and correlated one with respect to the other so as to attain the desired objectives.

More specifically, the system 10 of the present invention includes a housing frame 14. The housing frame has a horizontal floor 16 formed of peripheral rods 18 in a rectangular configuration. Cross support rods 20 form a rectangular access space 22. The housing also has a roof 24 formed of peripheral rods 26 in a generally rectangular configuration. A central rod 28 with diagonal support rods 30 form an A-frame. The housing also has sides 32 formed of vertical rods 34 coupling the floor and roof with diagonal support rods 36. The rods are formed of welded-together steel.

A wooden floor 40 is positioned on the floor of the frame with an opening 42 over the access space. A wooden door has a cross-strengthening brace 44 with protruding ends 46 receivable within recesses 48 in the frame.

A fabric roof 50 is positionable over the roof of the frame.

Four side walls 52 are positionable over the sides of the frame.

Eyelets 56 are formed in the frame at an upper extent of one side wall. A chain 58 is positionable around a supporting tree with turn buckles 60 coupling the eyelets and chain to retain the housing at an elevated location.

Upstanding hooks 64 are located at each upper corner of the frame. An associated lifting device 66 is formed of a plate 68 and chain 70 surrounding the tree. A supporting structure 72 and pulley 74 have a movable rope 76 for lifting the frame to an elevated location for then being supported by the eyelets, chain and turn buckles.

The present invention is a tree stand that will hold two hunters comfortably protected from wind and rain. It is especially designed for adults accompanying young hunters. The tree stand is provided to hold up to 500 pounds. The frame is 100 percent welded and the finished assembly is supported by 1000 pound chain and two 500 pound turnbuckles at the top. A 300 pound chain and two 300 pound turnbuckles are located at the bottom.

A bottom entrance in the form of a trap door is provided through the flooring. It measure 20 inches by 24 inches with a metal 1 inch by 1 inch by 0.065 inch brace with boss for total safety.

The frame includes a removable top section. This section can be covered with a waterproof tarp. Burlap may be added on top to quiet rain noise.

The system would contain all hardware for installing and/or hanging. The present invention is spacious enough for comfort, yet compact enough for practicality.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved two-person tree stand system for deer hunting comprising, in combination:
   a housing frame having a horizontal floor formed of peripheral rods in a rectangular configuration with cross support rods forming a rectangular access space, the housing frame also having a roof formed of peripheral rods in a generally rectangular configuration and a central rod with diagonal support rods forming an A-frame, the housing frame also having sides formed of vertical rods coupling the floor and the roof with diagonal support rods, the rods being formed of welded-together steel;
   a wooden floor positioned on the floor of the housing frame with an opening over the access space, the wooden floor having a cross-strengthening brace with protruding ends receivable within recesses in the frame;
   a fabric roof positionable over the roof of the housing frame;
   four side walls positionable over the sides of the housing frame;
   eyelets formed in the housing frame at an upper extent of one side wall with a chain positionable around a supporting tree with turn buckles coupling the eyelets and chain to retain the housing frame at an elevated location; and
   upstanding hooks at each upper corner of the frame with an associated lifting device formed of a plate and a chain for surrounding the tree and a supporting structure and a pulley having a movable rope for lifting the housing frame to an elevated location for then being supported by the eyelets, chain and turn buckles.

2. A two-person tree stand system for deer hunting comprising:
   a housing frame having a horizontal floor formed of peripheral rods in a rectangular configuration with cross support rods forming a rectangular access space, the housing frame also having a roof formed of peripheral rods in a generally rectangular configuration and a central rod with diagonal support rods forming an A-frame, the housing also having sides formed of vertical rods coupling the floor and the roof with diagonal support rods;
   a wooden floor positioned on the floor of the frame with an opening over the access space, the wooden floor having a cross-strengthening brace with protruding ends receivable within recesses in the housing frame;
   a fabric roof positionable over the roof of the housing frame;
   four side walls positionable over the sides of the frame and;
   eyelets formed in the frame at an upper extent of one side wall with a chain positionable around a supporting tree with turn buckles coupling the eyelets and chain to retain the housing at an elevated location.

3. The system as set forth in claim 2 and further including upstanding hooks at each upper corner of the housing frame with an associated lifting device formed of a plate and a chain surrounding the tree and a supporting structure and a pulley having a movable rope for lifting the housing frame to an elevated location for then being supported by the eyelets, chain and turn buckles.

* * * * *